United States Patent
Cech et al.

(10) Patent No.: US 11,550,881 B2
(45) Date of Patent: Jan. 10, 2023

(54) METHOD FOR MANAGING SOFT IP LICENSES ON A PARTIALLY RECONFIGURABLE HARDWARE SYSTEM

(71) Applicant: Siemens Aktiengesellschaft, Munich (DE)

(72) Inventors: Christian Cech, Ebreichsdorf (AT); Bernhard Fischer, Vienna (AT); Martin Matschnig, Tulln (AT); Amandus Kofler, Erfinder verstorben (AT)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 1 day.

(21) Appl. No.: 17/273,761

(22) PCT Filed: Aug. 28, 2019

(86) PCT No.: PCT/EP2019/072977
§ 371 (c)(1),
(2) Date: Mar. 5, 2021

(87) PCT Pub. No.: WO2020/048847
PCT Pub. Date: Mar. 12, 2020

(65) Prior Publication Data
US 2021/0200839 A1   Jul. 1, 2021

(30) Foreign Application Priority Data
Sep. 6, 2018 (EP) .................................... 18192913

(51) Int. Cl.
*G06F 21/10* (2013.01)
*G06F 21/12* (2013.01)
(Continued)

(52) U.S. Cl.
CPC .......... *G06F 21/105* (2013.01); *G06F 21/123* (2013.01); *G06F 21/6281* (2013.01);
(Continued)

(58) Field of Classification Search
CPC .. G06F 21/105; G06F 21/123; G06F 21/6281; G06F 21/76; G06F 2221/0751; G06F 2221/0757
(Continued)

(56) References Cited

U.S. PATENT DOCUMENTS 6,904,527 B1   6/2005 Parlour et al.
2001/0044897 A1*   11/2001 Ishiguro ................. G11B 19/04
(Continued)

OTHER PUBLICATIONS

Roel Maes et al: "A Pay-per-Use Licensing Scheme for Hardware IP Cores in Recent SRAM-Based FPGAs", IEEE Transactions on Information Forensics and Security, IEEE, Piscataway, NJ, US, vol. 7, No. 1, pp. 98-108; Abstract; pp. 98, col. 2; pp. 99, col. 3; pp. 100, col. 1-col. 2; pp. 101, col. 1; pp. 103, col. 1-col. 2; pp. 105, col. 1; 2012.
(Continued)

*Primary Examiner* — Michael S McNally
(74) *Attorney, Agent, or Firm* — Cozen O'Connor

(57) ABSTRACT

A method for managing licenses for soft IP on a partially reconfigurable hardware system, in particular an FPGA, wherein a license manager is provided in the non-configurable part of the hardware system, or is accessible only for the non-configurable part of the hardware system, where the license manager has exclusive access to a non-volatile memory in which license data having a time restriction of the useful life of at least one soft IP is stored, where before activating a particular soft IP, the license manager checks whether the useful life has expired, where the license manager only releases use of the soft IP if the useful life has not yet expired, where the license data is changed using a
(Continued)

key, which is stored in a non-volatile memory for license data, and where a new key is stored and the preceding key is deleted when the license data is changed.

16 Claims, 3 Drawing Sheets

(51) Int. Cl.
    *G06F 21/62*     (2013.01)
    *G06F 21/76*     (2013.01)

(52) U.S. Cl.
    CPC ...... *G06F 21/76* (2013.01); *G06F 2221/0751* (2013.01); *G06F 2221/0757* (2013.01)

(58) Field of Classification Search
    USPC .......................................................... 726/26
    See application file for complete search history.

(56) References Cited

U.S. PATENT DOCUMENTS

2018/0196965 A1*   7/2018   Torres ................... G06F 21/125
2018/0253261 A1*   9/2018   Kripalani .............. G06F 3/0659

OTHER PUBLICATIONS

PCT International Search Report and Written Opinion of International Searching Authority dated Oct. 10, 2019 corresponding to PCT International Application No. PCT/EP2019/072977 filed Aug. 28, 2019.

\* cited by examiner

METHOD FOR MANAGING SOFT IP LICENSES ON A PARTIALLY RECONFIGURABLE HARDWARE SYSTEM

CROSS-REFERENCE TO RELATED APPLICATIONS

This is a U.S. national stage of application No. PCT/EP2019/072977 filed 28 Aug. 2019. Priority is claimed on European Application No. 18192913.4 filed 6 Sep. 2018, the content of which is incorporated herein by reference in its entirety.

BACKGROUND OF THE INVENTION

1. Field of the Invention

The present invention relates to a partially reconfigurable hardware system (FPGA) and method for managing licenses for soft IPs on the a FPGA.

2. Description of the Related Art

A Field Programmable Gate Array (FPGA) is an integrated circuit in digital technology in which a logic circuit can be programmed. Unlike in the programming of computers or controllers, programming here relates only secondarily to the specification of time sequences in the component but primarily to the definition of the functional structure therefore. The mode of operation of individual logic elements (blocks) in the FPGA and the wiring thereof among themselves is defined by the programming of the wiring of the specified elements. The configuration or the design of an FPGA is also referred to, therefore.

As a rule, system designers use what are known as soft IPs (soft intellectual properties) in the design of reconfigurable hardware systems, for example FPGAs. As a rule, soft IP is in the form of source code or in the form of a network list and is implemented in the freely programmable range of an FPGA.

There are frequently IP core generators, therefore, with which the user can generate soft IP, for instance, in the form of network lists, for the different FPGA models of a manufacturer. Typical examples of soft IPs are processor cores (for example, soft IP cores) optimized for the respective FPGA architecture which, together with their programs, are integrated in the FPGA as required. A further class are interface controllers for buses, but also controllers for actuating external DRAM memory modules.

The soft IPs are usually purchased in addition. Licenses for using these soft IPs are awarded either directly for a particular target device (use per device) or for a non-limited group of target devices (bulk license), which is usually expensive. Once the license has been awarded and the soft IP is operating on the target device, the period in which the soft IP is operated can no longer be controlled by the soft IP owner (licensor).

It would be advantageous for the licensor if a utilization period for the licensed soft IP could be defined and use of the soft IP beyond this period could be impeded or prevented.

Previous approaches to license management include only solutions, which enable operation of a proprietary soft IP on a reconfigurable hardware system, but without a practical possibility of time limiting soft IP use.

One approach is based on the principle where a device identification (device ID), such as a unique ID (an identifier) of an FPGA, is sent to the soft IP licensor. A personalization module, as a rule a secret key, supplied by the manufacturer of the device, such as the manufacturer of the FPGA, is played into the device. Using this key, the device can now be configured with the soft IP, usually in the form of an encrypted bit file, supplied by the soft IP licensor, with the relevant key, based on the device identification. The soft IP in the form of the bit file can only be used for a particular device, therefore. Multiple use is not possible.

A similar approach uses public key cryptography to connect a soft IP to a particular device.

In yet another different approach, a trustworthy "metering authority" manages one or more key(s), which are each uniquely assigned to a combination of device identification of an FPGA and a particular soft IP. A system designer can now activate a soft IP specifically for his FPGA device via a "metering bitstream" as a permanent part in the FPGA. This is called device enrollment, see "A Pay-per-Use Licensing Scheme for Hardware IP Cores in Recent SRAM-Based FPGAs", Roel Maes, Dries Schellekens, Ingrid Verbauwhede, IEEE Transactions on Information Forensics and Security, volume 7, no. 1, pages 99-108, February 2012 in this regard.

U.S. Pub. No. 2018/0196965 A1 discloses a method for authenticating and licensing IP-protected hardware modules, which can be selectively activated and used. For this, licenses are generated for the IP-protected hardware modules, which can be used only for particular devices with a unique device ID and are stored in a license memory. The IP-protected modules can be activated by a license server via an activation code, where it is possible to extract the activation code from the license only with the unique device ID.

U.S. Pat. No. 6,904,527 B1 also discloses a protection method for IP modules in a programmable logic circuit. The IP modules can be licensed directly to the users of the programmable, logic circuit, which has a unique identification, where the user receives an authorization code, which is used for protection and for checking authorized use of the IP-protected module by the programmable logic circuit.

SUMMARY OF THE INVENTION

It is an object of the present invention to provide a method for managing licenses for soft IP, which enables a time restriction of the useful life of a soft IP installed on a reconfigurable hardware system and to further increase security, where the time restriction of the useful life can consist in a specified absolute period and/or in a specified duration of the actual use of the soft IP.

This and other objects and advantages are achieved in accordance with the invention by a method in that which a license manager is provided in the non-configurable part of the hardware system, or is accessible only for the non-configurable part of the hardware system, where the license manager has exclusive access to a non-volatile memory in which license data comprising a time restriction of the useful life of at least one soft IP is stored, before activating a particular soft IP, the license manager checks whether the useful life has expired, the license manager only releases use of the soft IP if the useful life has not yet expired, and where the license data is changed using a key, which is stored in a non-volatile memory for license data, and a new key is stored and the preceding key is deleted when the license data is changed.

The actual utilization periods can be recorded by the license manager. The license data contains the limit on use. If this limit is reached, then the soft IP is deactivated by the license manager.

An advantage of the inventive method is that no connection to external license servers or other external aids is necessary.

The license manager and the non-volatile memory for the license data can be arranged directly in the non-configurable part of the hardware system. However, it is also possible that the license manager and the non-volatile memory for the license data are stored in a further non-volatile memory that is connected by hardware to the non-configurable part of the hardware system, so license manager and license data are loaded into the hardware system before commissioning. As a rule, the further non-volatile memory is arranged in the immediate physical vicinity of the remaining partially reconfigurable hardware system.

So that a change in the license data of a particular soft IP, such as a license issue, license extension or license termination on the part of the licensor, can occur in an appropriately secure manner, the license data is changed using a key, which is stored in the non-volatile memory for license data. Here, when the license data is changed, a new key is stored and the preceding key is deleted.

In one embodiment of the invention, the license manager checks whether the useful life has expired at particular, specified time intervals.

It can be provided in this connection that checking occurs with a specified fixed clock frequency, which is specified by the partially reconfigurable hardware system. The clock frequency can be derived, for instance, from the CPU of the hardware system.

In another embodiment of the invention, a report is output to a designer of the partially reconfigurable hardware system if a license has expired. This ensures that the designer can quickly acquire a new license and the hardware system can shortly be used again as intended.

As a rule, a separate circuit section for licensing control communicates the activity thereof to the license manager in the soft IP. The license manager then records the time activity of the soft IP and checks the validity license. In this regard, a circuit section for licensing control can be provided in the configurable part of the hardware system for each soft IP, via which circuit section the activity of the soft IP is communicated to the license manager.

Here, it is possible for the circuit sections for licensing control to be connected to the license manager by a separate license interface. Only the circuit sections of the individual soft IPs provided for licensing control then communicate via this license interface with the license manager, therefore.

It is also an object the invention to provide a partially reconfigurable hardware system, in particular an FPGA, for implementing the inventive method. In this case, a license manager is provided in the non-configurable part of the hardware system, or is accessible only for the non-configurable part of the hardware system, where the license manager has exclusive access to a non-volatile memory in which license data comprising a time restriction of the useful life of at least one soft IP is stored, and where the license manager is configured to check whether the useful life has expired that before activating a particular soft IP, and to only release use of the soft IP if the useful life has not yet expired. Furthermore, the license manager is configured to check a change in the license data using a key and after successful checking, to store new license data and replace the key with a new key.

As previously explained in connection with the inventive method, the license manager and the non-volatile memory for the license data are arranged in the non-configurable part of the hardware system. Alternatively, the license manager and the non-volatile memory for the license data are stored in a further non-volatile memory which is connected by hardware to the non-configurable part of the hardware system, so that the license manager and license data can be loaded into the hardware system before commissioning.

A circuit section for licensing control can be provided in the configurable part of the hardware system for each soft IP, where the circuit sections for licensing control are connected to the license manager by a separate license interface.

As a result of the inventive method, or the inventive partially reconfigurable hardware system, by using the license manager, the owner (licensor) of the soft IP is given the opportunity, with a particular partially reconfigurable hardware system that is already in use to limit use of the soft IP in terms of time.

On the other hand, this also provides the opportunity of offering the user a time-limited license from the outset, and this can be associated with lower costs for the user than an unlimited license.

The owner (licensor) of the soft IP can also ascertain thereby the actual useful life of the soft IP because it optionally evaluates the later purchases of licenses by the user. Use profiles may be created therefrom.

License use can also be calculated with the present invention via the actual activity of the soft IP. For example, there can be no license settlement for those periods where the soft IP is not being used, for example is in the power-down mode in other words.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In order to explain the invention further, reference will be made in the following part of the description to the figures from which further advantageous embodiments, details and developments of the invention can be taken. The figures should be understood as examples and are intended to present the inventive character but not restrict it in anyway or even conclusively reproduce it, in which.

DETAILED DESCRIPTION OF THE EXEMPLARY EMBODIMENTS

Figure 1:
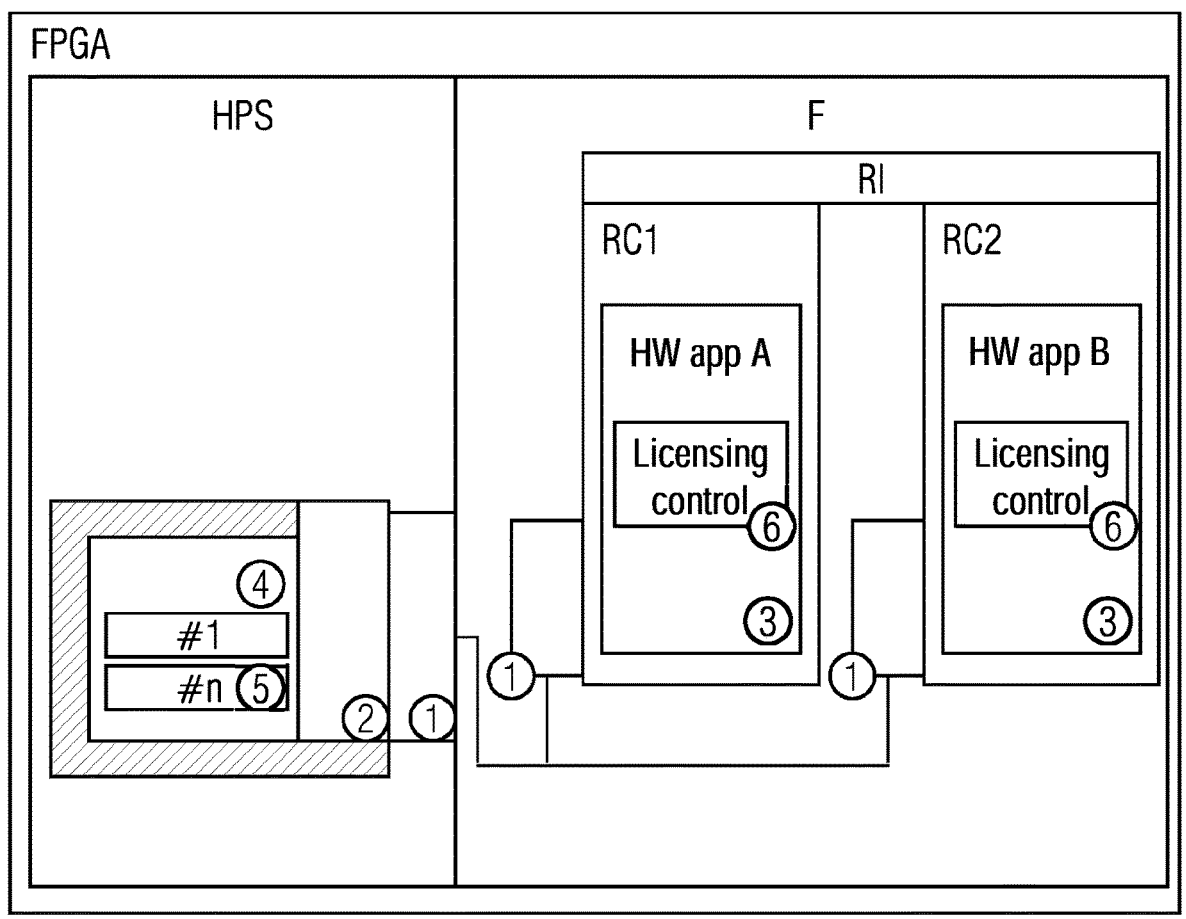
FIG. 1 shows a schematic diagram of an inventive Field Programmable ARRAY (FPGA)

FIG. 1 shows a schematic diagram of an inventive partially reconfigurable FPGA, which comprises a hard processor system (HPS) HPS, which is not configurable, and a configurable, "fabric" F. A license interface 1 is implemented between HPS and fabric F. One or more soft IPs 3, which are provided in the fabric F, communicate via this license interface 1 with a license manager 2, which is provided in the HPS. The license manager 2 has exclusive access to a non-volatile memory 4, which contains license data 5 for license management, here license data #1 to license data #n. The data for license management enables the current runtime of a soft IP 3 to be tracked.

The fabric F contains a reconfiguration interface RI, which contains one or more reconfiguration container(s) RC1, RC2. Each reconfiguration container RC1, RC2 contains at least one soft IP 3, designated here by "HW app A" or "HW app B", and a circuit section 6 for licensing control. Each reconfiguration container RC1, RC2 is connected to the license interface 1 of the HPS by a separate license interface 1.

The activity of a soft IP 3 is communicated to the license manager 2 via a circuit section 6 for licensing control, which is provided in the soft IP 3. The license manager 2 allows the implementation of a soft IP 3 only if valid license data #1, . . . , #n exists, for example if a time-limited license, for example for 100 operating hours, has not yet expired for the relevant soft IP 3.

Figure 2:
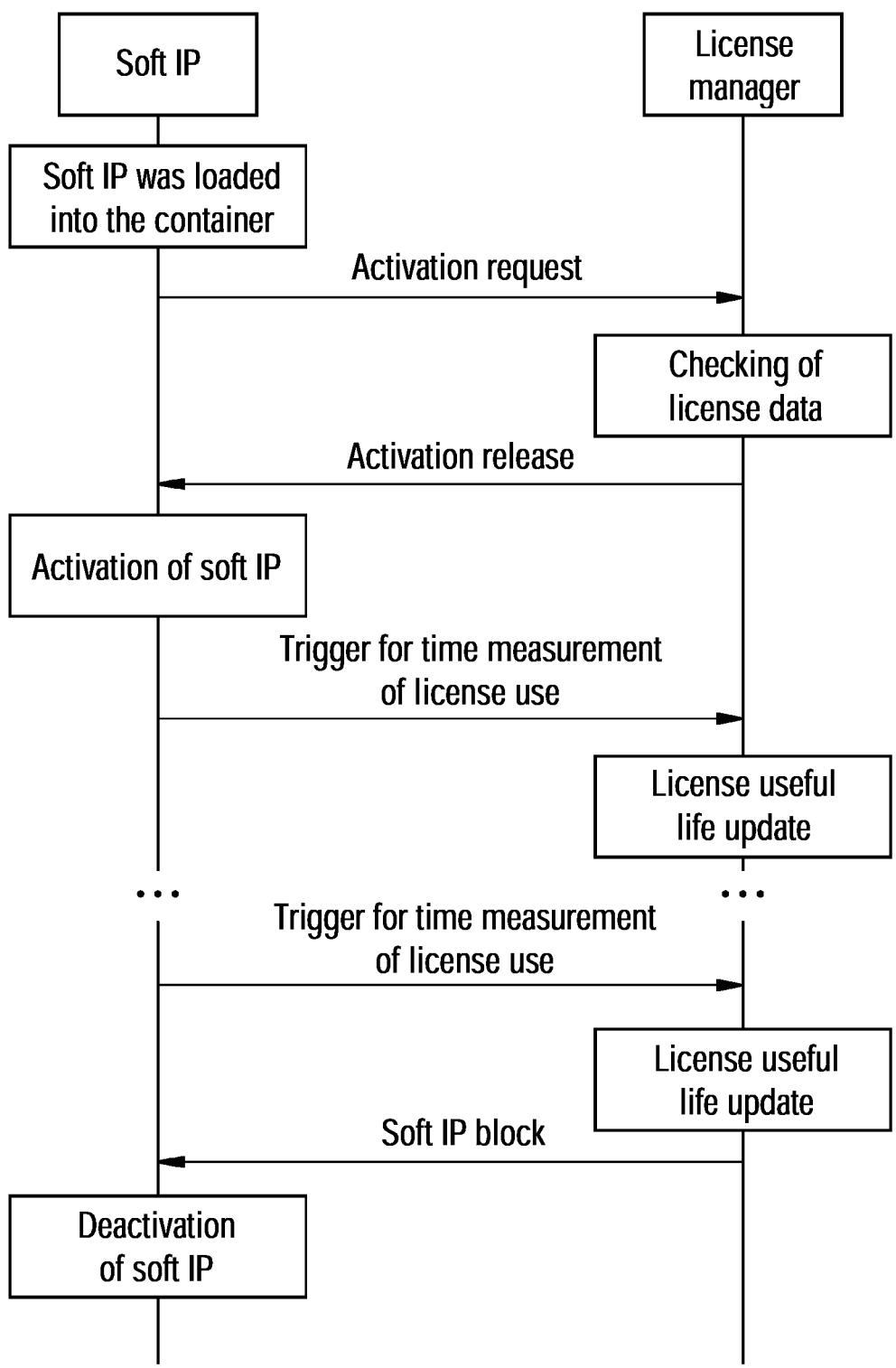
FIG. 2 shows a flowchart for license management in accordance with the invention.

FIG. 2 illustrates the sequence of the individual steps of the FPGA license management. Here, FIG. 2 shows the course of communication between soft IP 3 and license manager 2 after successful loading of the binary files of the soft IP 3 into the corresponding container (reconfiguration container RC1, RC2) into the fabric F of the FPGA.

The CPU loads the binary file of the soft IP 3 via a reconfiguration interface RI into the corresponding reconfiguration container RC1, RC2 (see step "soft IP was loaded into the container"). The soft IP 3 checks the availability of a valid license before activation of the functionality, see step "activation request". For this, the soft IP 3 connects to the license manager 2 via the license interface 1. The license manager checks the stored license data 5 for this soft IP 3 (see step "checking of license data"), and sends the corresponding activation data back to the soft IP 3 (see step "activation release"). If the license data is missing or has expired no activation data is sent to the soft IP, then there is no "activation release", therefore.

The license manager 2 includes a logic, which updates the license data 5 (see "license useful life update"). If a soft IP 3 has been loaded, for which the license has not yet expired (see step "activation of the soft IP"), then the runtime of this soft IP is recorded in the license data 5 (see step "trigger for time measurement of license use"). The runtime can be recorded, for example, cyclically at particular, specified time intervals (see the repeated steps "trigger for time measurement of license use"). As a rule, recording takes place by using a fixed clock frequency, specified by the FPGA. If the available runtime has expired, if the soft IP has already been active, for example, for 100 hours, then the function of the soft IP is stopped. For this, the license manager 2 sends a deactivation command ("soft IP block") via the license interface 1 to the soft IP in order to deactivate it ("deactivation of soft IP"). The license manager 2 can now also issue a report, which informs the user about the expired license.

Figure 3:
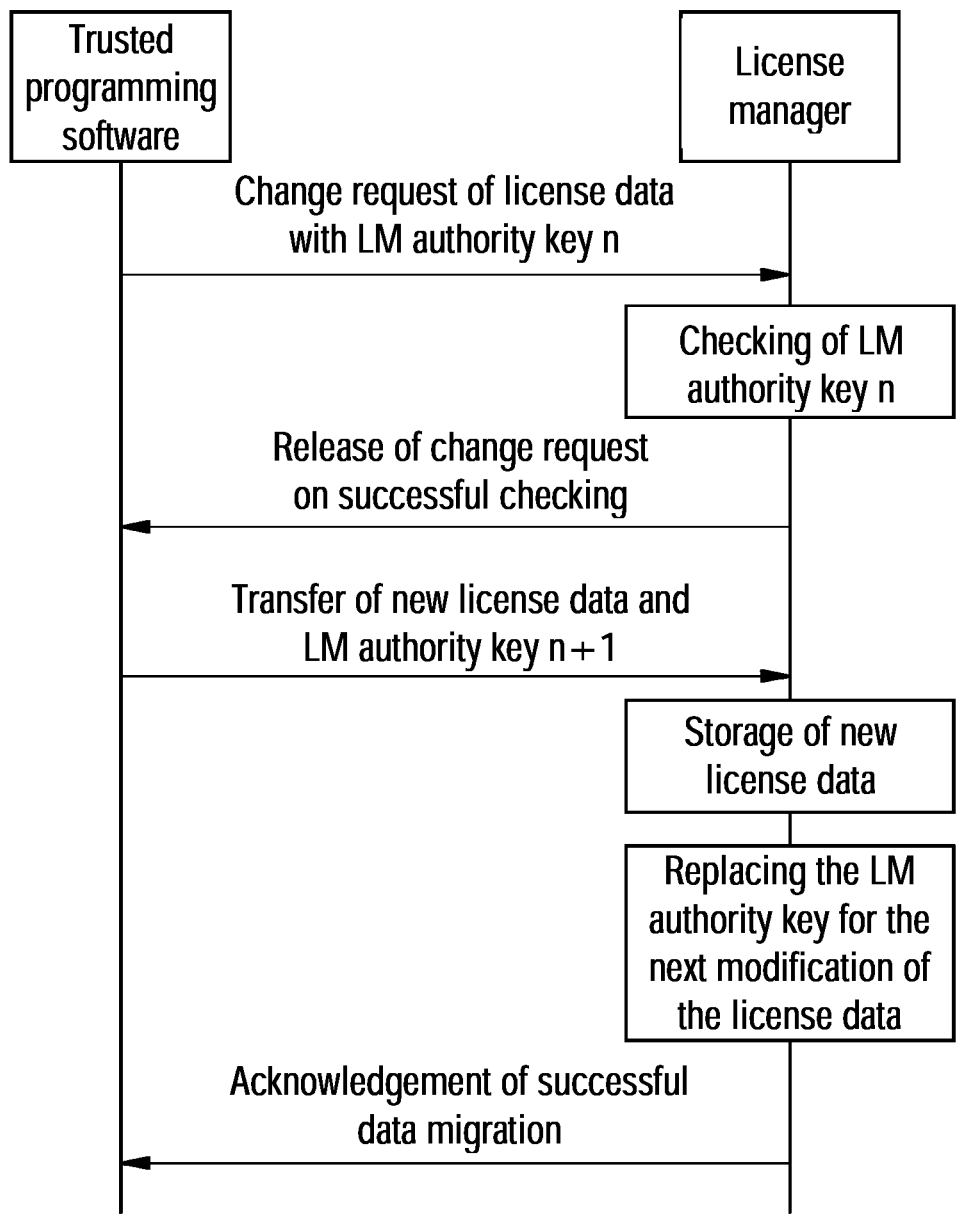
FIG. 3 shows a flowchart for the installation of new license data in accordance with the invention.

FIG. 3 shows the sequence of an installation of new license data, more precisely the communication sequence on modification of the license data 5 in the non-volatile memory 4 of the FPGA, between trusted programming software (for example, from the FPGA manufacturer) and the license manager 2 in the FPGA.

The license manager 2 contains a logic, which stores or modifies the license data 5 of a soft IP 3, in particular a new one, in the non-volatile memory 4. The key required for this is stored as a secret and protected key in the non-volatile memory 4 and is referred to as the license management authority key (see "LM authority key" in FIG. 3). A license is issued, extended or terminated either via trusted programming software provided by the FPGA manufacturer or a licensing soft IP. This procedure is known from the prior art (see, for instance, the above-cited publication "A Pay-per-Use Licensing Scheme for Hardware IP Cores in Recent SRAM-Based FPGAs" in this regard).

To protect the license data 5 from unauthorized access, following each license issue, extension or termination, the license management authority key is renewed in the non-volatile memory 4 and the previous license management authority key deleted. The soft IP owner or licensor transfers the license data 5 for a soft IP 3 to the FPGA manufacturer. The FPGA manufacturer adds the currently valid license management authority key "LM authority key n" and the license management authority key for the next modification, the "LM authority key n+1", to the license data 5 and sends this to the FPGA designer. The designer updates the license data 5 for the soft IP 3 in the FPGA via trusted programming software or licensing soft IP, together with the data from the FPGA manufacturer.

In FIG. 3, the trusted programming software sends a change request of the license data with the "LM authority key n" to the license manager 2. The license manager checks the "LM authority key n" and "on successful checking", the "release of change request" takes place. As a consequence, "transfer of new license data and LM authority key n+1" from the trusted programming software to the license manager occurs. In the license manager, "storage of new license data" and "replacing the LM authority key for the next modification of the license data" occur. Once this has occurred, the license manager sends an "acknowledgement of successful data migration" to the trusted programming software.

One example of a possible embodiment to the storage location of the license manager 2 and the license data 5 in the HPS is an external non-volatile memory (provided outside of the HPS), with the license manager 2 and the license data 5 then being loaded into the HPS from the external memory on FPGA start-up.

The external non-volatile memory can also be located on a secured chip, e.g., a cryptochip, such as a VaultIC420™, whereby the data is also protected against unauthorized physical change.

The reconfiguration interface RI and reconfiguration containers RC1, RC2 can also be omitted in the inventive method and instead conventional bit files (without previous partial reconfiguration) can be used as the soft IP 3.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for managing licenses for soft intellectual properties (IP) on a partially reconfigurable hardware system, the method comprising:
providing a license manager in a non-configurable part of the partially reconfigurable hardware system, said license manager alternatively being accessible only for the non-configurable part of the partially reconfigurable hardware system, and said license manager having exclusive access to a non-volatile memory in which license data comprising a time restriction of a useful life of at least one soft IP is stored;
checking, by the license manager, whether the useful life has expired before activating a particular soft IP;
releasing, by the license manager, use of the soft IP only if the useful life has not yet expired;
changing the license data utilizing a key stored in a non-volatile memory for the license data; and
storing a new key when the license data is changed and deleting a preceding key.

2. The method as claimed in claim 1, wherein the license manager checks whether the useful life has expired at particular, specified time intervals.

3. The method as claimed in claim 2, wherein said checking occurred with a specified fixed clock frequency which is specified by the partially reconfigurable hardware system.

4. The method as claimed in claim 1, wherein a report is output to a designer of the partially reconfigurable hardware system if a license has expired.

5. The method as claimed in claim 1, wherein the license manager and the non-volatile memory for the license data are arranged in the non-configurable part of the partially reconfigurable hardware system.

6. The method as claimed in claim 1, wherein the license manager and the non-volatile memory for the license data are saved in a further non-volatile memory connected by hardware to the non-configurable part of the partially reconfigurable hardware system, the license manager to permit loading of license data into the partially reconfigurable hardware system before commissioning.

7. The method as claimed in claim 1, wherein a circuit section for licensing control is provided in the configurable part of the partially reconfigurable hardware system for each soft IP, activity of the soft IP being communicated to the license manager via said circuit section.

8. The method as claimed in claim 7, wherein circuit sections for licensing control are connected to the license manager by a separate license interface.

9. The method as claimed in claim 1, wherein the partially reconfigurable hardware system comprises a Field Programmable Gate Array (FPGA).

10. A partially reconfigurable hardware system, comprising:
a license manager arranged in a non-configurable part of the partially reconfigurable hardware system, said license manager alternatively being accessible only for the non-configurable part of the partially reconfigurable hardware system, and said license manager having exclusive access to a non-volatile memory in which license data comprising a time restriction of a useful life of at least one soft intellectual property (IP) is stored; and
wherein the license manager is configured to check whether the useful life has expired before activating a particular soft IP and only release use of the soft IP if the useful life has not yet expired; and
wherein the license manager is further configured to check a change in license data utilizing a key and, after a successful check, store new license data and replace the key with a new key.

11. The partially reconfigurable hardware system as claimed in claim 10, wherein the license manager and the non-volatile memory for the license data are arranged in the non-configurable part of the partially reconfigurable hardware system.

12. The partially reconfigurable hardware system as claimed in claim 10, wherein the license manager and the non-volatile memory for the license data are stored in a further non-volatile memory which is connected by hardware to the non-configurable part of the partially reconfigurable hardware system to permit loading of the license manager and license data into the partially reconfigurable hardware system before commissioning.

13. The partially reconfigurable hardware system as claimed in claim 10, wherein a circuit section for licensing control is arranged in a configurable part of the partially reconfigurable hardware system for each soft IP; and wherein circuit sections for licensing control are connected to the license manager by a separate license interface.

14. The partially reconfigurable hardware system as claimed in claim 11, wherein a circuit section for licensing control is arranged in a configurable part of the partially reconfigurable hardware system for each soft IP; and wherein circuit sections for licensing control are connected to the license manager by a separate license interface.

15. The partially reconfigurable hardware system as claimed in claim 12, wherein a circuit section for licensing control is arranged in a configurable part of the partially reconfigurable hardware system for each soft IP; and wherein circuit sections for licensing control are connected to the license manager by a separate license interface.

16. The partially reconfigurable hardware system as claimed in claim 10, wherein the partially reconfigurable hardware system comprises a Field Programmable Gate Array (FPGA).

* * * * *